US006397321B1

(12) United States Patent
Yamamoto et al.

(10) Patent No.: US 6,397,321 B1
(45) Date of Patent: May 28, 2002

(54) DIGITAL SIGNAL PROCESSOR (75) Inventors: Yusuke Yamamoto; Yasuyuki Muraki, both of Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/362,950

(22) Filed: Jul. 28, 1999

(30) Foreign Application Priority Data

Aug. 6, 1998 (JP) .......................................... 10-223359

(51) Int. Cl.[7] .............................................. G06F 9/318
(52) U.S. Cl. ........................................ 712/35; 713/320
(58) Field of Search ...................... 712/35, 36; 713/310, 713/320, 330

(56) References Cited

U.S. PATENT DOCUMENTS

| | | | | |
|---|---|---|---|---|
| 5,652,903 A | * | 7/1997 | Weng | 712/35 |
| 5,790,824 A | * | 8/1998 | Asghar | 712/209 |
| 6,085,314 A | * | 7/2000 | Asghar | 712/213 |

FOREIGN PATENT DOCUMENTS

TW          318915         11/1997

* cited by examiner

Primary Examiner—Eric Coleman
(74) Attorney, Agent, or Firm—Morrison & Foerster LLP (57) ABSTRACT A digital signal processor which can reduce the electric power consumption in a fine manner according to the contents of processing to be executed. An arithmetic device performs arithmetic operations according to operation instructions. A storage device stores plural sets of the operation instructions and control instructions corresponding to respective ones of the operation instructions and indicative of kinds of processings to be executed according to the respective ones of the operation instructions. A control device is disposed to receive an externally supplied control signal indicative of kinds of processings to be executed by the digital signal processor, and reads out the operation instructions and the control instructions corresponding to the respective ones of the operation instructions and renders the arithmetic device inoperative when a kind of processing indicated by the control signal and a kind of processing indicated by each of the control instructions read out do not coincide with each other.

15 Claims, 5 Drawing Sheets

DIGITAL SIGNAL PROCESSOR

BACKGROUND OF THE INVENTION

1. Field of the Invention

The present invention relates to a digital signal processor which is suitable for curtailment of the electric power consumption.

2. Prior Art

Some personal computers used in recent years are equipped with sound source boards. These sound source boards are adapted to perform not only reproduction processing of reproducing musical tones based upon musical performance data given in the form of MIDI (Musical Instrument Digital Interface) data or the like, but also coding and decoding processing of converting an analog sound signal given from an external device outside the personal computer into digital sound data and converting such digital sound data into an analog sound signal, using a codec part within the sound source board. The sound source boards are able to further perform various other processings to process the digital sound data thus obtained, such as rate conversion processing of converting the sampling rate of the data, filtering processing, and mixing processing of mixing the data with other digital sound data. The digital sound data obtained by these processings are finally recorded in a storage device such as a hard disk drive within the personal computer (the above-mentioned processings other than the reproduction processing will be hereinafter generally called "recording processing"). The reproduction processing and the recording processing are generally carried out by the use of a digital signal processor (hereinafter called "DSP").

Such a DSP is comprised of an operation part (arithmetic device) for carrying out operations of summing products and others, input and output parts as interfaces, and a control part including a ROM (Read Only Memory) storing commands or instructions for controlling the operation part and the input and output parts. Responsive to a clock signal supplied from an external device to the DSP, fixed-length instructions for the reproduction processing and the recording processing are read out from the ROM within the control part, so that various parts of the DSP operate to sequentially execute the readout instructions. The above clock signal is also used as an operating clock for various parts of the DSP.

In the meanwhile, an increase in the electric power consumption of an electric circuit may raise not only a problem of an increased power consumption amount but also an increased cost of the power supply circuit, and therefore, also in personal computers there is a demand for reduced electric power consumption. Particularly, laptop computers and notebook-sized computers, which operate on electric power from a battery, are seriously required to have reduced amounts of power consumption when they are continuously operated for a long time. To this end, in DSPs of the above-mentioned kind, an attempt has been made to curtail the power consumption by allowing supply of the clock signal to the DSP only when it is needed and interrupting the same (or inhibiting the clock signal from being input) when it is not needed, to stop the operation of the DSP.

Figure 1:
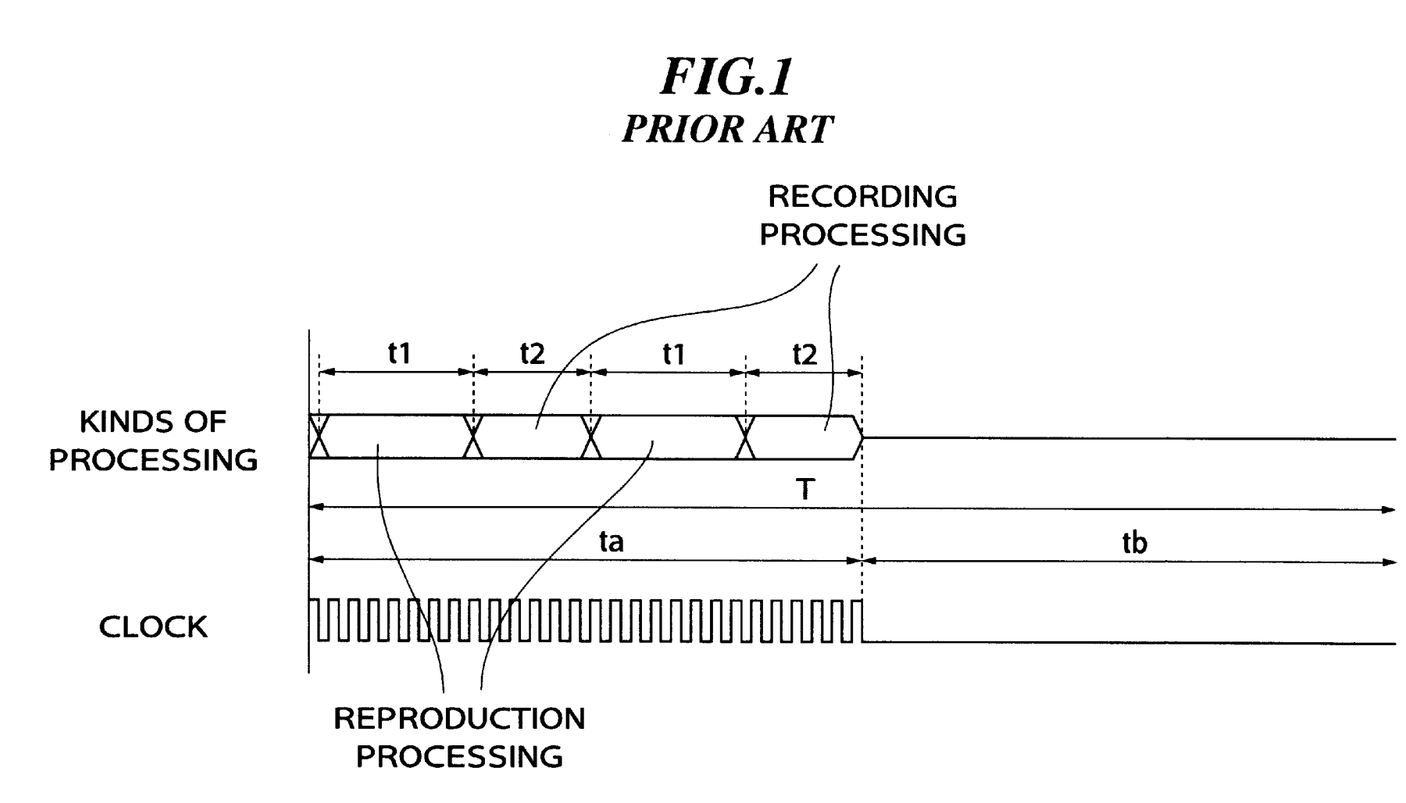
FIG. 1 is a timing chart showing the operation of an DSP having a power curtailment function according to the prior art.

FIG. 1 is a timing chart showing the operation of an DSP having the above-mentioned power curtailment function. In FIG. 1, the upper row shows kinds of processing performed by the DSP, and the lower row shows a clock signal supplied to the DSP. In FIG. 1, the time period T, which is the sum of time periods ta and tb, corresponds to one sampling period. In other words, all the instructions stored in the ROM should be executed within the time period T. In the illustrated example, the DSP causes the clock signal to start to be supplied to the DSP, executes all the processings according to the fixed-length instructions within the time period ta, and stops the clock signal from being supplied upon completion of the execution of all the fixed-length instructions. Since the time period tb is obtained by subtracting the time period ta from the time period T, the DSP is inoperative to reduce the power consumption during the time period tb while it is operative consuming the electric power during the time period ta. During the time period ta, a series of processings comprising the reproduction processing and the recording processing are carried out according to the fixed-length instructions. On this occasion, the DSP reads out the predetermined fixed-length instructions from the ROM and sequentially executes reproduction processing, recording processing, reproduction processing, and recording processing in the order mentioned.

Although in the illustrated example the fixed-length instructions contain programs corresponding respectively to the reproduction processing and the recording processing, in actuality all the processings are not always executed for every piece of sampling data. That is, although the fixed-length instructions contain a plurality of processing programs so as to provide the maximum possible effects, in actuality a case where all the processing programs are not executed occurs more frequently than a case where all the processing programs are executed. As the former case, for example, if only the reproduction processing, which appears twice in FIG. 1 is to be executed for a cetain piece of sampling data, the DSP does not perform any processing during the time period t2 corresponding to the recording processing appearing twice in FIG. 1, but the clock signal continues to be supplied to the DSP so that the DSP continues operating even during the time period t2, resulting in wasteful consumption of the electric power.

SUMMARY OF THE INVENTION

It is therefore an object of the present invention to provide a digital signal processor which is capable of controlling (reducing or restraining) the electric power consumption in a fine manner according to the contents of processing to be executed.

To attain the above object, the present invention provides a digital signal processor comprising an arithmetic device that performs arithmetic operations according to operation instructions, a storage device that stores plural sets of the operation instructions and control instructions corresponding to respective ones of the operation instructions, for discriminating the respective ones of the operation instructions, and a control device that is disposed to receive an externally supplied control signal, the control device reading out the operation instructions and the control instructions corresponding to the respective ones of said operation instructions and controlling operation of the arithmetic device based upon the control signal and the control instructions read out.

To attain the above object, the present invention also provides a digital signal processor comprising an arithmetic device that performs arithmetic operations according to operation instructions, a storage device that stores plural sets of the operation instructions and control instructions corresponding to respective ones of the operation instructions and indicative of kinds of processings to be executed according to the respective ones of the operation instructions, and a control device that is disposed to receive an externally supplied control signal indicative of kinds of processings to be executed by the digital signal processor, the control device reading out the operation instructions and the control instructions corresponding to the respective ones of the operation instructions and rendering the arithmetic device inoperative when a kind of processing indicated by the control signal and a kind of processing indicated by each of the control instructions read out do not coincide with each other.

To attain the above object, the present invention further provides a digital signal processor for executing a plurality of processings in a time-sharing manner, comprising an arithmetic device that performs arithmetic operations according to operation instructions, a storage device that stores plural sets of the operation instructions and control instructions corresponding to respective ones of the operation instructions and indicative of kinds of the plurality of processings to be executed according to the respective ones of the operation instructions, and a control device that is disposed to receive an externally supplied control signal indicative of kinds of the plurality of processings to be executed by the digital signal processor, the control device reading out the operation instructions and the control instructions corresponding to the respective ones of the operation instructions and rendering the arithmetic device inoperative when a kind of processing indicated by the control signal and a kind of processing indicated by each of the control instructions read out do not coincide with each other.

Preferably, the control device renders the arithmetic device inoperative by inhibiting one of the operation instructions, to which the each of the control instructions read out corresponds, from being supplied to the arithmetic device.

Alternatively, the control device renders the arithmetic device inoperative by inhibiting a clock signal, on which the arithmetic device operates, from being supplied to the arithmetic device.

The present invention can be applied even to a digital signal processor, wherein the arithmetic device comprises CMOS transistors which have very low electric power consumption, so as to further reduce the electric power consumption.

Advantageously, the storage device comprises a non-volatile memory, such as a ROM.

Alternatively, the storage device may comprise a volatile memory such as a RAM. In this case, it may be so arranged that the plural sets of operation instructions and control instructions are transferred to the non-volatile memory from an external hard disk or the like, upon the start of operation of the digital signal processor.

The above and other objects, features, and advantages of the invention will become more apparent from the following detailed description taken in conjunction with the accompanying drawings.

BRIEF DESCRIPTION OF THE DRAWINGS

FIGS. 4A to 4F collectively form a timing chart useful in explaining the operation of the DSP according to the embodiment, in which:

DETAILED DESCRIPTION

The present invention will be described in detail with reference to the drawings showing a preferred embodiment thereof and a variaton of the embodiment.

Figure 2:
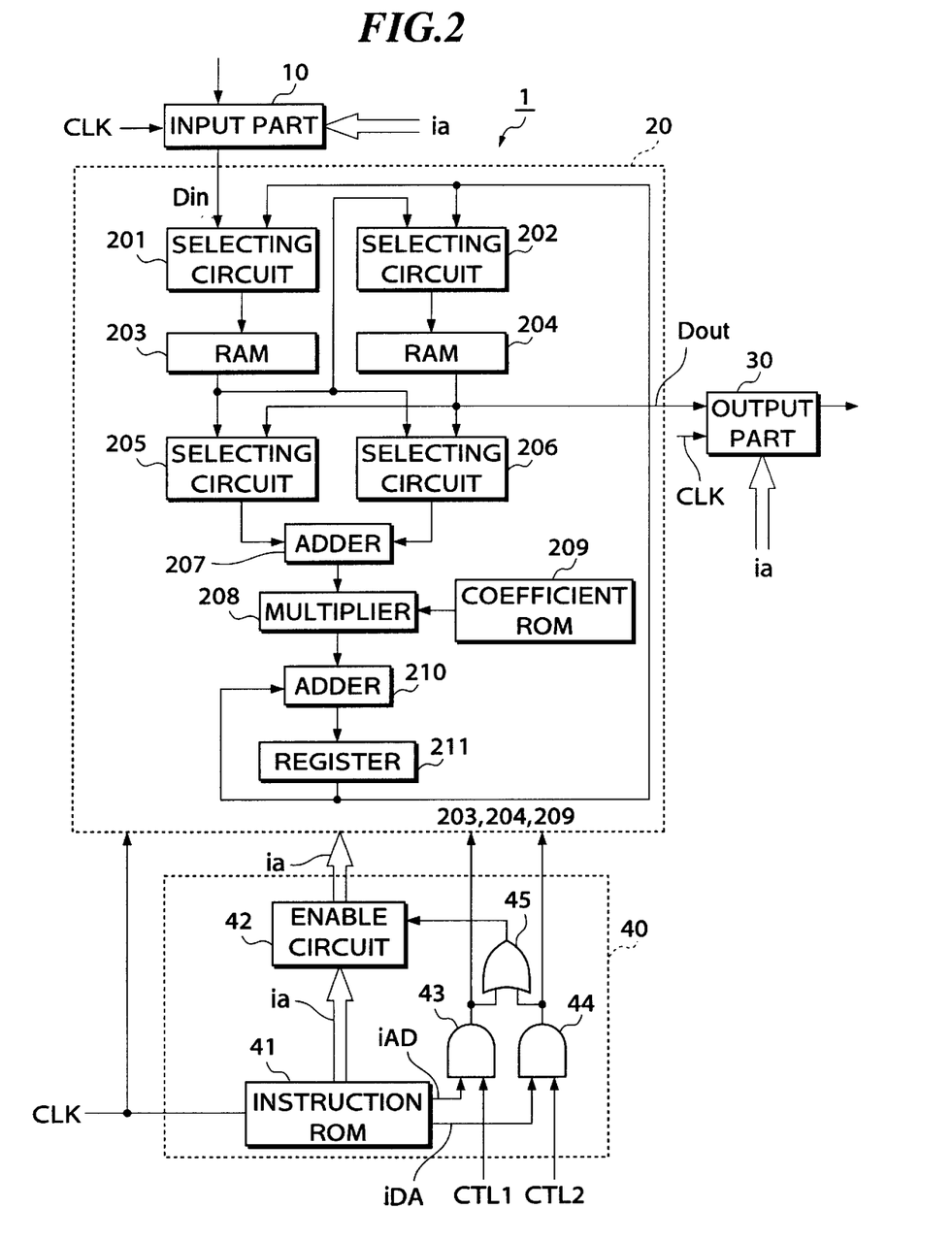
FIG. 2 is a block diagram showing the configuration of a digital signal processor (DSP) according to an embodiment of the present invention.

FIG. 2 shows the configuration of a digital signal processor (hereinafter referred to as "DSP") according to one embodiment of the present invention. In FIG. 2, reference numeral 1 designates DSP which is provided in a sound source board of a personal computer and adapted to perform A/D conversion processing and D/A conversion processing. In the A/D conversion processing, one or more analog sound signals are subjected to A/D conversion, and the resulting digital sound data are mixed together into recorded musical data. In the D/A conversion processing, one or more reproducing musical tone data are subjected to sampling frequency conversion and mixed together, and the mixed data is subjected to D/A conversion into a reproduced musical tone signal.

The DSP 1 is formed of CMOS transistors. The CMOS transistors have such a characteristic that when the level of the input data signal is inverted, they allow current to flow therethrough, while they consume almost no current in a steady state. Therefore, the power consumption of the DSP 1 can be reduced by stopping the arithmetic operation of the DSP 1. RAMs and ROMs, some of which will be referred to later, are provided within the DSP 1, which are formed of differential amplifiers which do not CMOS operations as mentioned above. Therefore, if current flowing through these parts can be reduced, the power consumption can be further curtailed. To this end, in the present embodiment, the supply of electric power to the differential amplifiers is controlled by controlling the enabling and disabling of the RAMS and ROMs.

The DSP 1 is comprised of an input part 10 which functions as an input interface for inputting data, an operation part (arithmetic device) 20 which operates on a clock signal, not shown, to perform FIR filtering and others, an output part 30 which functions as an output interface for outputting data, and a control part (control device) 40 which issues and delivers an operation instruction to the operation part 20, etc. The operation instruction ia is for causing various parts of the DSP 1 to operate, and includes instructions directly related to arithmetic operations such as multiplication and addition, as well as instructions as to inputting and outputting of data.

The operation part 20 operates such that when input data Din is input through the input part 10 in response to the operation instruction ia, the input data Din is stored in a RAM 203 through a selecting circuit 201. In this connection, data from a register 211, hereinafter referred to, is also delivered to the selecting circuit 201 in a feedback manner, and the selecting circuit 201 in turn delivers the selected data to the RAM 203 according to the operation instruction ia.

Thus, the RAM 203 is adapted to store not only the input data Din but also results of processing performed by arithmetic circuits provided at subsequent stages. In this manner, the input data Din are subjected to filtering with a certain characteristic and then they can be subjected to another filtering with a different characteristic.

Next, when data is read out from the RAM 203, the data is applied through a selecting circuit 205 to one input terminal of an adder 207, while the other input terminal of the adder 207 is supplied with data from a selecting circuit 206, so that the two pieces of data are added together by the adder 207. A RAM 204 and a selecting circuit 202 are provided at the input side of the selecting circuit 206, which are controlled by the operation instruction ia so as to enable complicated operations to be carried out.

Output data from the adder 207 is delivered to a multiplier 208, wherein it is multiplied by coefficient data K from a coefficient ROM 209. The coefficient ROM 209 is disposed to be enabled by the operation instruction ia to read out coefficient data K from a storage area thereof corresponding to an address indicated by the operation instruction ia. The coefficient data K is a tap coefficient value for an FIR filter, for example. The coefficient ROM 209 as well as the RAMs 203 and 204 are controlled by output signals from AND circuits 43 and 44 of the control part 40, to be selectively enabled or disabled according to the kind of processing to be executed, such as A/D conversion processing and D/A conversion processing. When they are disabled, the supply of electric power to sense amplifiers provided within them is restrained to thereby curtail the power consumption.

Output data from the multiplier 208 is applied to one input terminal of an adder 210, and output data from the adder 210 is applied to the other input terminal of the adder 210 through the register 211. As this loop is repeatedly executed, summing of products is carried out to thereby perform the FIR filtering.

When data indicative of the results of operation thus obtained is output from the register 211, it is stored in the RAM 204 through the selecting circuit 202 according to the operation instruction ia, and the data is read from the RAM 204 in predetermined timing and supplied to the output part 30 as output data Dout. Thus, the operation part 20 is constructed to perform inputting and output of data and arithmetic operations according to the operation instruction ia. Therefore, if the supply of the operation instruction ia to the operation part 20 is stopped, the operation of the operation part 20 is stopped.

The control part 40 is comprised of an instruction ROM 41 (storage device), an enable circuit 42, AND circuits 43 and 44, and an OR circuit 45. The data format of the instruction ROM 41 will now be described by referring to FIG. 3. The instruction ROM 41 is formed of a non-volatile memory. In the illustrated example of FIG. 3, a group of instructions G1 for A/D conversion processing are stored in a storage area corresponding to addresses 1 to N, and a group of instructions G2 for D/A conversion processing are stored in a storage area corresponding to addresses N+1 to M. The instruction groups G1 and G2 each consist of an operation instruction ia comprising instructions ia1 to iaN or iaN+1 to iaM, and a power saving instruction (control instruction) ib comprising instructions ib1 to ibN or ibN+1 to ibM indicative of kinds of the respective corresponding operation instructions ia. The read address is increased step-by-step in synchronism with a clock signal CLK (FIG. 2) so that sets of operation instruction ia and power saving instruction ib are sequentially read out from the ROM 41. For example, if the read address is "2", a set of operation instruction ia2 and power saving instruction ib2 is read out. In the illustrated example, when the operation instructions ia and power saving instructions ib have been read out from the locations of addresses 1 to M, the read address is returned to the address 1 to again start reading operation, and thereafter the same reading operation is repeated. Thus, the operation instructions ia are read out always in the predetermined sequence, and there is no branching mechanism for changing the reading sequence or skipping addresses depending upon some conditions during reading operation.

Figure 3:
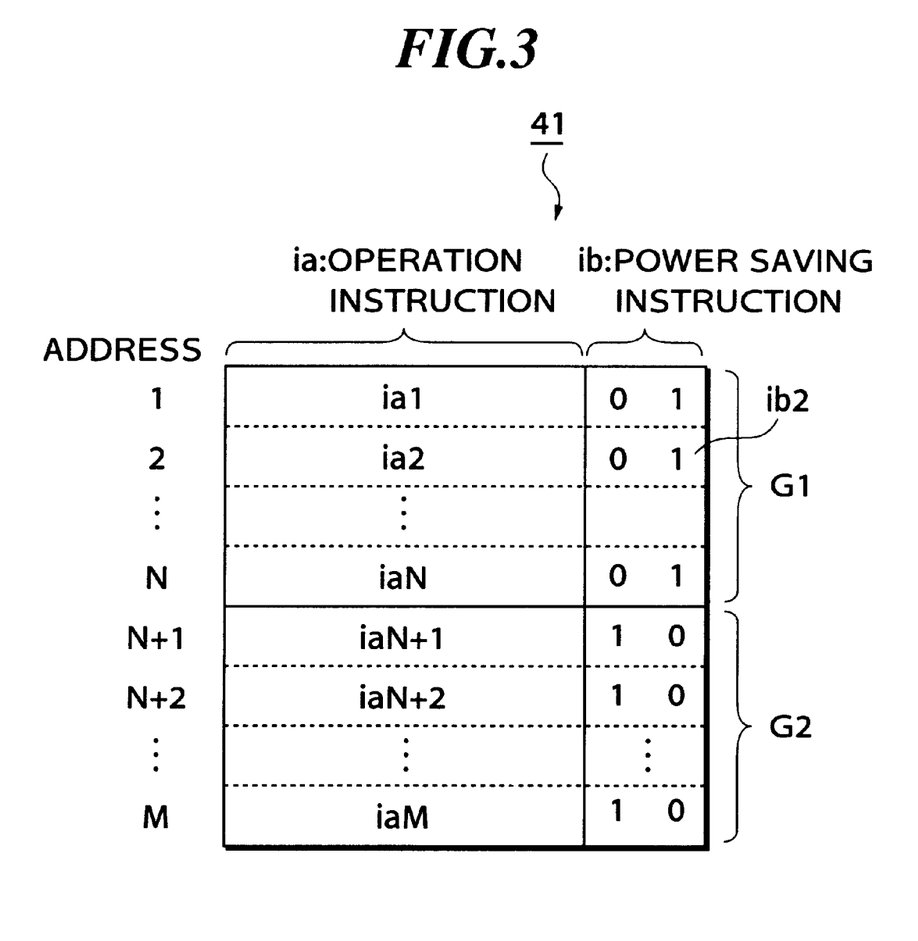
FIG. 3 is a view showing a data format of an instruction ROM employed in the DSP according to the embodiment.

In the illustrated example, each power saving operation ib is formed of 2 bits, and the lower or less significant bit is set to "1" when an operation instruction is to be selected from the instruction group G1, and the upper or more significant bit is set to "1" when an operation instruction is to be selected from the instruction group G2. Therefore, by referring to the power saving instruction ib, it can be determined which instruction group the operation instruction ia simultaneously read out belongs to, in other words, the kind of processing to be executed by the operation instruction ia can be determined.

The lower bit of the power saving instruction ib is supplied to the AND circuit 43 as an instruction signal iAD for A/D conversion processing, and the upper bit of the same to the AND circuit 44 as an instruction signal iDA for D/A conversion processing (see FIG. 2). A first control signal CTL1 and a second control signal CTL2 are supplied to the AND circuit 43 and the AND circuit 44, respectively, from a CPU, not shown, which controls the whole personal computer. The first control signal CTL1 assumes "1" only when the CPU is to cause the DSP 1 to execute the A/D conversion processing, and the second control signal CTL2 assumes "1" only when the CPU is to cause the DSP 1 to execute the D/A conversion processing. Therefore, the OR circuit 45 generates an output "1" only when the kind of processing that the CPU is to cause the DSP 1 to execute and the kind of processing indicated by the operation instruction ia read from the instruction ROM 41 agree to each other.

The enable circuit 42 is controlled by an output signal from the OR circuit 45 so as to allow the operation instruction ia from the instruction ROM 41 to be supplied to the operation part 20, etc. only when the output signal assumes "1", and inhibit the supply of the operation instruction ia when the output signal assumes "0". Thus, the operation of th DSP 1 can be controlled according to the kind of processing to be executed, based upon the first and second control signals CTL1, CTL2. The CPU always monitors the operative state of the DSP 1, and supplies the first and second control signal CTL1, CTL2 to the control part 40 in predetermined timing. Thus, the first and second control signals CTL1, CTL2 and the processing executed by the DSP 1 can be synchronized with each other.

Next, the operation of the DSP 1 according to the present embodiment constructed as above will be described with reference to FIGS. 4A to 4F showing changes in various parameters related to the operation of the control part 40.

Figure 4A:
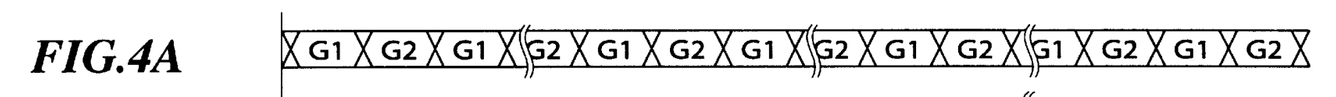
FIG. 4A shows an instruction group G1 and an instruction group G2.
Figure 4B:
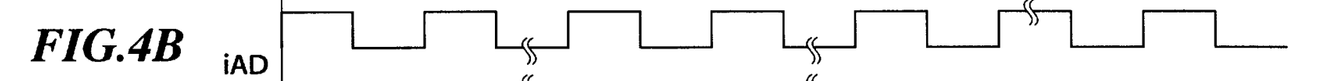
FIG. 4B shows an instruction signal iAD for instructing A/D conversion processing.
Figure 4C:
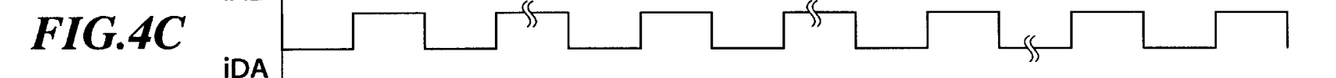
FIG. 4C shows an instruction signal iDA for instructing D/A conversion processing.

As the clock signal CLK is repeatedly supplied to the instruction ROM 41, the instruction group G1 and the instruction group G2 are alternately read out from the instruction ROM 41, as shown in FIG. 4A. In the 5 illustrated example, in each time period during which an operation instruction of the instruction group G1 is read out, the lower bit of the corresponding power saving instruction ib assumes "1", and in each time period during which an operation instruction of the instruction group G2 is read out, the upper bit of the power saving instruction ib assumes "1", and accordingly the A/D conversion processing instruction signal iAD changes as shown in FIG. 4B, and the D/A conversion processing instruction signal iDA changes as shown in FIG. 4C.

Figure 4D:
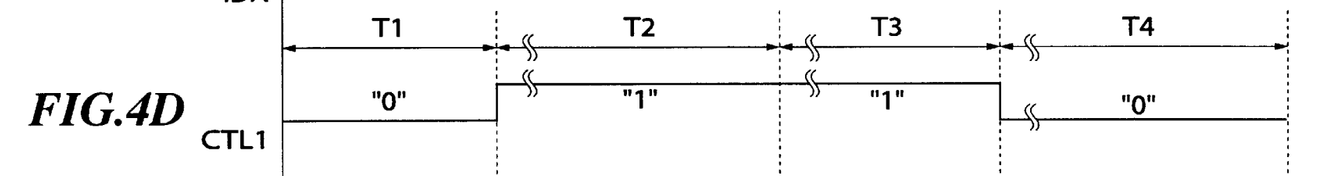
FIG. 4D shows a first control signal CTL1.
Figures 4E, 4F:
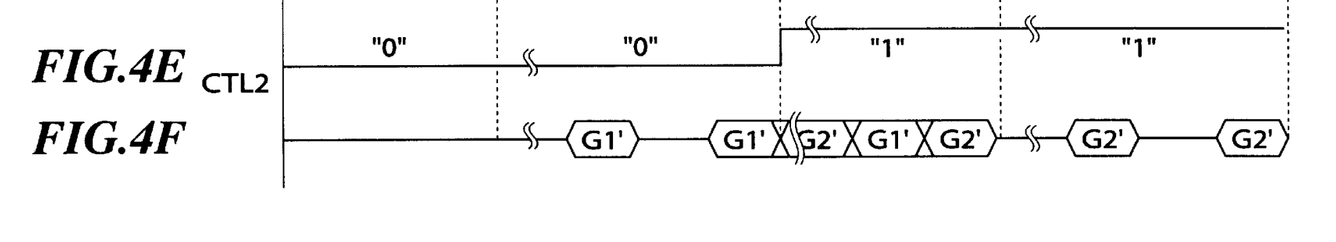
FIG. 4E shows a second control signal CTL2.
FIG. 4F shows an operation instruction ia.

Here, if the first control signal CTL1 and the second control signal CTL2 change as shown in FIG. 4D and FIG. 4E, respectively, the operation instruction ia is generated from the enable circuit 42 as shown in FIG. 4F. In FIG. 4F, symbol G1' denotes an output corresponding to an operation instruction ia of the instruction group G1, and G2' an output corresponding to an operation instruction ia of the instruction group G2.

In the illustrated example, in a time period T1 the first control signal CTL1 and the second control signal CTL2 both assume "0". This indicates a case where the CPU does not cause the DSP 1 to execute any processing. In this case, neither of the instruction groups G1', G2' is generated from the enable circuit 42 so that the DSP 1 is inoperative, whereby almost no electric power is consumed.

In the next time period T2, the first control signal CTL1 assumes "1", and the second control signal CTL2 assumes "0". This indicates a case where the CPU causes the DSP 1 to execute only the A/D conversion processing. In this case, only the instruction group G1' corresponding to the A/D conversion processing is supplied to the operation part 20, while the instruction group G2' is not supplied, as shown in FIG. 4F. Thus, the DSP 1 is operated only during time periods in which the A/D conversion processing is required to be executed, while it is not operated during time periods for executing the D/A conversion processing. As a result, the electric power consumption by the DSP 1 can be reduced. For example, if the time period for executing the A/D conversion processing (time period for outputting the instruction group G1) and the time period for executing the D/A conversion processing (time period for outputting the instruction group G2) are equal to each other, the amount of electric power consumption can be reduced nearly to half.

Next, in a time period T3, the first control signal CTL1 and the second control signal CTL2 both assume "1". This indicates a case where the CPU causes the DSP 1 to perform both the A/D conversion processing and the D/A conversion processing. In this case, the instruction group G1' and the instruction group G2' are supplied to the operation part 20 in a time-sharing manner. Accordingly, the DSP 1 executes the two kinds of processing in a time-sharing manner.

Next, in a time period T4, the first control signal CTL1 assumes "0", and the second control signal CTL2 assumes "1". This indicates a case where the CPU causes the DSP 1 to execute only the D/A conversion processing. In this case, conversely to the case with the time period T2, only the instruction group G2' corresponding to the D/A conversion processing is supplied to the operation part 20, while the instruction group G1' is not supplied. Therefore, the amount of electric power consumption can be reduced nearly to half, similarly to the case with the time period T2.

As described above, according to the present embodiment, the operation instruction ia and the power saving instruction ib are stored in the instruction ROM 41 in correlation to each other beforehand, and the operation instruction ia is supplied to the operation part 20, depending upon the kind of processing indicated by the power saving instruction ib and the first and second control signals CTL1, CTL2 externally supplied to the DSP 1 and indicating the kind of processing required by the CPU to be executed, that is, only when the corresponding processing is required to be executed. As a result, in executing a plurality of processings by the DSP 1 in a time-sharing manner, the DSP 1 can be caused to stop operating during time periods corresponding to a processing not required to be executed, to thereby greatly reduce the electric power consumption.

The present invention is not limited to the above described embodiment, and various modifications and variations thereof are possible, as follows, for example:

1) In the above described embodiment, whether to supply the operation instruction ia to the operation part 20, etc. is determined for each of the A/D conversion processing and the D/A conversion processing, on the premise that the A/D conversion processing and the D/A conversion processing are carried out by the DSP in a time-sharing manner. The essential feature of the present invention, however, lies in that only a desired or required processing is executed depending upon an externally supplied control signal, while the DSP is caused to stop operating during time periods when no processing is required to be executed, to thereby reduce the electric power consumption. To this end, it may suffice that the power saving instruction ib can discriminate the operation instruction ia to be executed, and therefore, it may be so arranged that if the kind of processing indicated by the control signal and the kind of processing indicated by the power saving instruction ib do not coincide with each other, the supply of the operation instruction ia is stopped.

2) Although in the above described embodiment the DSP 1 is formed of CMOS transistors, alternatively only the operation part 20 may be formed of CMOS transistors, and the other parts may be formed of bipolar transistors.

Figure 5:
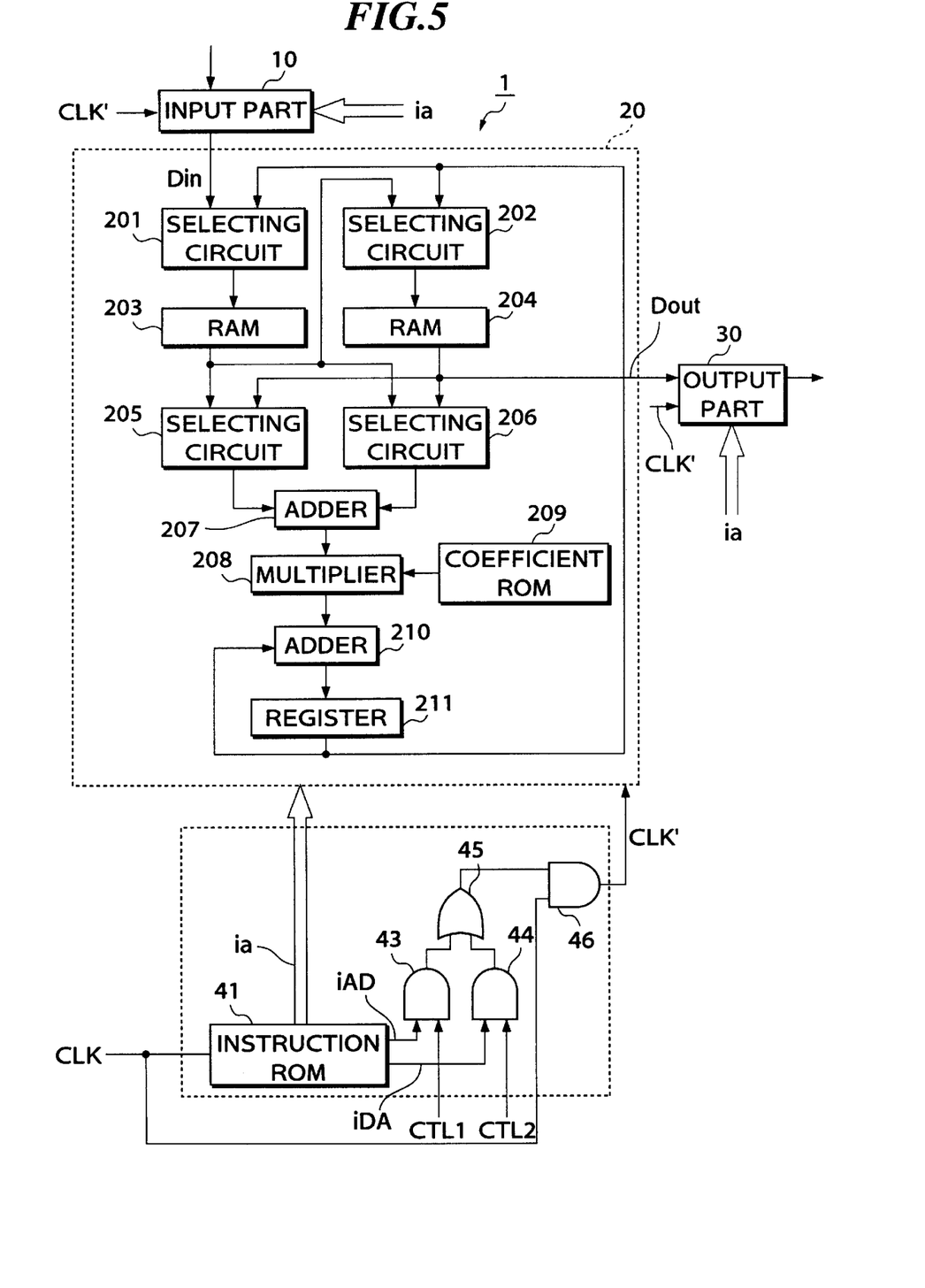
FIG. 5 is a block diagram showing the configuration of a DSP according a variation of the embodiment.

3) Although in the above described embodiment and variations, the curtailment of the electric power consumption is carried out by stopping the supply of the operation instruction ia to the operation part 20, etc. in a certain case, depending upon the power saving instruction ib and the control signals CTL1, CTL2, the present invention is not limited to this arrangement, but alternatively any other method or means may be employed insofar as it can bring the operation part 20 into an inoperative state. For example, the DSP 1 may be constructed as shown in FIG. 5. In the construction of FIG. 5, the operation instruction ia read from the instruction ROM 41b is directly supplied to the operation part 20, etc., and the clock signal CLK and the output signal from the OR circuit 45 are supplied to an AND circuit 46 such that the clock signal CLK is gated by the output signal from the OR circuit 45, and the resulting clock signal CLK' is supplied to the operation part 20', etc. The operation part 20, etc. operate on the clock signal CLK'. With this alternative arrangement, the operation of the operating part 20, etc. can be selectively permitted and stopped, depending upon the first control signal CTL1 and the second control signal CTL2.

4) Although in the above described embodiment and variations the instruction ROM 41 is formed of a non-volatile memory, alternatively it may be formed of a volatile memory, such as a RAM. In this case, it may be so constructed that the sets of operation instruction ia and power saving instruction ib are transferred to the volatile memory from a hard disk or the like, upon the start of operation of the personal computer.

5) Although in the above described embodiment the instruction group G1' or G2' is allotted to each bit of the power saving instruction ib, alternatively the power saving instruction ib may be coded so as to design the instruction ROM 41 compact in size. For example, a three-bit power saving instruction may be used so as to cope with eight different kinds of operations.

As described above, according to the present invention, plural sets of operation instructions and control instructions for discriminating the operation instructions are stored in a storage device, so that operation instructions and control instructions corresponding thereto can be read out from the storage device, whereby the operation of the arithmetic device is controlled based upon a control signal and the readout control instructions. As a result, the arithmetic device can be operated only when required, thereby enabling curtailment of the electric power consumption.

What is claimed is:

1. A digital signal processor comprising:

an arithmetic device that performs arithmetic operations according to operation instructions;

a storage device that stores plural sets of said operation instructions and control instructions corresponding to respective ones of said operation instructions and indicative of kinds of processings to be executed according to said respective ones of said operation instructions; and a control device that is disposed to receive an externally supplied control signal indicative of kinds of processings to be executed by said digital signal processor, said control device reading out said operation instructions and said control instructions corresponding to said respective ones of said operation instructions and rendering said arithmetic device inoperative when a kind of processing indicated by said control signal and a kind of processing indicated by each of said control instructions read out do not coincide with each other.

2. A digital signal processor as claimed in claim 1, wherein said arithmetic device comprises CMOS transistors.

3. A digital signal processor as claimed in claim 1, wherein said storage device comprises a non-volatile memory.

4. A digital signal processor as claimed in claim 1, wherein said storage device comprises a volatile memory.

5. A digital signal processor for executing a plurality of processings in a time-sharing manner, comprising:

an arithmetic device that performs arithmetic operations according to operation instructions;

a storage device that stores plural sets of said operation instructions and control instructions corresponding to respective ones of said operation instructions and indicative of kinds of said plurality of processings to be executed according to said respective ones of said operation instructions; and a control device that is disposed to receive an externally supplied control signal indicative of kinds of said plurality of processings to be executed by said digital signal processor, said control device reading out said operation instructions and said control instructions corresponding to said respective ones of said operation instructions and rendering said arithmetic device inoperative when a kind of processing indicated by said control signal and a kind of processing indicated by each of said control instructions read out do not coincide with each other.

6. A digital signal processor as claimed in claim 5, wherein said control device renders said arithmetic device inoperative by inhibiting one of said operation instructions, to which said each of said control instructions read out corresponds, from being supplied to said arithmetic device.

7. A digital signal processor as claimed claim in claim 5, wherein said control device renders said arithmetic device inoperative by inhibiting a clock signal, on which said arithmetic device operates, from being supplied to said arithmetic device.

8. A digital signal processor as claimed in claim 5, wherein said arithmetic device comprises CMOS transistors.

9. A digital signal processor as claimed in claim 5, wherein said storage device comprises a non-volatile memory.

10. A digital signal processor as claimed in claim 5, wherein said storage device comprises a volatile memory.

11. A digital signal processor as claimed in claim 1, wherein said control device renders said arithmetic device inoperative by inhibiting one of said operation instructions, to which said each of said control instructions read out corresponds, from being supplied to said arithmetic device.

12. A digital signal processor as claimed claim in claim 1, wherein said control device renders said arithmetic device inoperative by inhibiting a clock signal, on which said arithmetic device operates, from being supplied to said arithmetic device.

13. A digital signal processor as claimed in claim 11, wherein said arithmetic device comprises CMOS transistors.

14. A digital signal processor as claimed in claim 11, wherein said storage device comprises a non-volatile memory.

15. A digital signal processor as claimed in claim 11, wherein said storage device comprises a volatile memory.

* * * * *